(12) United States Patent
Vampola et al.

(10) Patent No.: US 11,740,723 B2
(45) Date of Patent: Aug. 29, 2023

(54) ELECTRONIC DEVICES HAVING LIGHT SENSORS OVERLAPPED BY DISPLAYS

(71) Applicant: Apple Inc., Cupertino, CA (US)

(72) Inventors: Kenneth J. Vampola, Los Altos, CA (US); Joshua A. Spechler, Cupertino, CA (US); Weili Chen, Champaign, IL (US); Christopher M. Dodson, Santa Clara, CA (US); Mahdi Nezamabadi, San Jose, CA (US)

(73) Assignee: Apple Inc., Cupertino, CA (US)

(*) Notice: Subject to any disclaimer, the term of this patent is extended or adjusted under 35 U.S.C. 154(b) by 34 days.

(21) Appl. No.: 16/401,861

(22) Filed: May 2, 2019

(65) Prior Publication Data
US 2020/0348790 A1    Nov. 5, 2020

(51) Int. Cl.
| | | |
|---|---|---|
| *G06F 3/041* | (2006.01) | |
| *H05B 47/11* | (2020.01) | |
| *G02F 1/13357* | (2006.01) | |
| *G09G 3/34* | (2006.01) | |
| *G02F 1/1335* | (2006.01) | |

(52) U.S. Cl.
CPC ...... *G06F 3/0416* (2013.01); *G02F 1/133606* (2013.01); *G09G 3/3406* (2013.01); *H05B 47/11* (2020.01); *G02F 1/133618* (2021.01); *G09G 2320/0626* (2013.01); *G09G 2360/144* (2013.01)

(58) Field of Classification Search
CPC . G06F 3/0416; H05B 47/11; G02F 1/133606; G02F 2001/133618; G09G 3/3406; G09G 2320/0626; G09G 2360/144
See application file for complete search history.

(56) References Cited

U.S. PATENT DOCUMENTS

| | | |
|---|---|---|
| 8,462,101 B2 | 6/2013 | Han et al. |
| 9,007,353 B2 | 4/2015 | Kuo et al. |
| 9,232,163 B2 | 1/2016 | Fossum et al. |
| 9,530,381 B1* | 12/2016 | Bozarth ............... G09G 3/3406 |
| 9,709,848 B2 | 7/2017 | Neveux |
| 9,726,948 B2 | 8/2017 | Fukuoka et al. |
| 10,032,148 B2 | 7/2018 | Glaser |
| 10,043,456 B1 | 8/2018 | de Greef |

(Continued)

FOREIGN PATENT DOCUMENTS

| | | |
|---|---|---|
| EP | 2940680 | 12/2013 |
| WO | 2016126460 | 8/2016 |

*Primary Examiner* — Wing H Chow
(74) *Attorney, Agent, or Firm* — TREYZ LAW GROUP; Jason Tsai (57) ABSTRACT

An electronic device may have a display with an array of pixels configured to display images for a user. The electronic device may have an ambient light sensor for gathering ambient light information. A set of the pixels may overlap the ambient light sensor so that ambient light measurements may be made on ambient light passing through the set of pixels. Control circuitry in the electronic device may control light transmission through the set of pixels so that different light transmission levels can be used in different ambient light conditions. Directional light measurements may be made by moving transparent pixels dynamically across the surface of the display overlapping the light sensor and/or by using pixelated light modulators to vary the angle of light rays measured by the ambient light sensor.

13 Claims, 7 Drawing Sheets

(56) References Cited

U.S. PATENT DOCUMENTS

| | | |
|---|---|---|
| 10,290,269 B2 | 5/2019 | Berdinis et al. |
| 10,297,211 B1 * | 5/2019 | Novoselov ............. G09G 3/348 |
| 2010/0238430 A1 * | 9/2010 | Meijer ................. G01S 3/7835 |
| | | 356/138 |
| 2012/0019492 A1 * | 1/2012 | Barnhoefer ............ H05B 45/12 |
| | | 345/207 |
| 2012/0320012 A1 | 12/2012 | Tamaki et al. |
| 2018/0368559 A1 * | 12/2018 | Wang ................... H04M 1/185 |

* cited by examiner

ELECTRONIC DEVICES HAVING LIGHT SENSORS OVERLAPPED BY DISPLAYS

BACKGROUND

This relates generally to electronic devices, and, more particularly, to electronic devices with light sensors.

Electronic devices such as laptop computers, cellular telephones, and other equipment are sometimes provided with light sensors. For example, ambient light sensors may be incorporated into a device to provide the device with information on current lighting conditions. Ambient light readings may be used in controlling the device. If, for example bright daylight conditions are detected, an electronic device may increase display brightness to compensate. Color ambient light sensors can detect changes in the color of ambient light so that compensating color cast adjustments can be made to displayed content.

It can be challenging to incorporate ambient light sensors into electronic devices. If care is not taken, an ambient light sensor may consume more space in an electronic device than desired or may occupy a location that affects the shape and size of the display.

SUMMARY

An electronic device may have a display with an array of pixels for displaying images for a user. The display may be a backlit liquid crystal display or other display in which light transmission through the pixels is varied during operation.

The electronic device may have an ambient light sensor for gathering ambient light information. A set of the pixels may overlap the ambient light sensor so that ambient light measurements may be made on ambient light passing through the set of pixels.

Control circuitry in the electronic device may control light transmission through the set of pixels so that different light transmission levels can be used in different ambient light conditions. Directional ambient light measurements may be made by moving transparent pixels dynamically across the surface of the display overlapping the light sensor and/or by using pixelated light modulators to vary the angle of light rays measured by the ambient light sensor.

DETAILED DESCRIPTION

Figure 1:
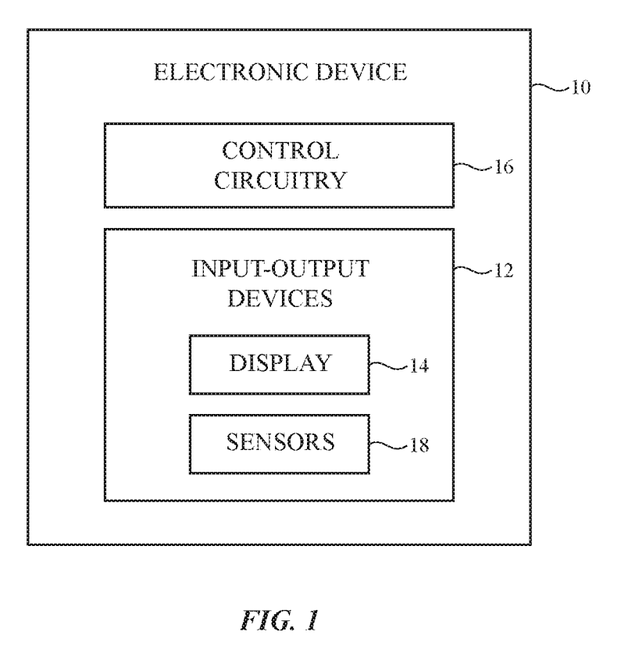
FIG. 1 is a schematic diagram of an illustrative electronic device having an ambient light sensor in accordance with an embodiment.

An illustrative electronic device of the type that may be provided with one or more optical components is shown in FIG. 1. The optical components that are included in the electronic device of FIG. 1 may include components that emit and/or detect light. In some arrangements, which may sometimes be described herein as an example, the optical components are optical sensors such as ambient light sensors.

Electronic device 10 of FIG. 1 may be a computing device such as a laptop computer, a computer monitor containing an embedded computer, a tablet computer, a cellular telephone, a media player, or other handheld or portable electronic device, a smaller device such as a wristwatch or other device worn on a user's wrist, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc. Control circuitry 16 may include communications circuitry for supporting wired and/or wireless communications between device 10 and external equipment. For example, control circuitry 16 may include wireless communications circuitry such as cellular telephone communications circuitry and wireless local area network communications circuitry.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, light-emitting diodes and other status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Input-output devices 12 may also include sensors 18. Sensors 18 may include a capacitive sensor, a light-based proximity sensor, a magnetic sensor, an accelerometer, a force sensor, a touch sensor, a temperature sensor, a pressure sensor, a compass, a microphone, a radio-frequency sensor, a three-dimensional image sensor, a camera, a light-based position sensor (e.g., a lidar sensor), and other sensors. Sensors 18 may also include one or more light detectors that are configured to detect ambient light. Sensors 18 may, for example, include one or more monochrome ambient light sensors and one or more color ambient light sensors that are configured to measure ambient light from the environment in which device 10 is operated. A monochrome ambient light sensor may be used to measure ambient light intensity. A color ambient light sensor may be used to measure the color (color spectrum, color temperature, color coordinates, etc.) of ambient light and may be used to measure ambient light intensity.

To make color measurements, a color ambient light sensor in device 10 may have a light detector such as a photodiode that is overlapped by a tunable wavelength filter and/or may have multiple channels each of which has a light detector such as a photodiode that is overlapped by a filter that passes a different color of light (e.g., a different wavelength band) to that light detector. By processing the readings from each of the multiple channels, the relative intensity of each of the different colors of light can be determined. Using data from the different channels in a color ambient light sensor, control circuitry 16 can therefore produce ambient light color temperature measurements and other color measurements (e.g., colors represented in color coordinates, etc.). The ambient light color information may be used in controlling display 14 and/or in taking other actions in device 10. As an example, the color cast of images displayed on display 14 can be adjusted based on ambient light color measurement (e.g., to make the images on display 14 yellower in warm ambient lighting conditions and to make the images on display 14 bluer in cold ambient lighting conditions). If desired, display brightness may be automatically increased by control circuitry 16 in response to detection of bright ambient light conditions and may be automatically decreased by control circuitry 16 in response to detection of dim ambient light conditions.

Electronic device 10 may include one or more ambient light sensors. Illustrative arrangements in which device 10 includes a single ambient light sensor are sometimes described herein as an example. In some configurations, the ambient light sensor may be located directly under or nearly under display 14. For example, the ambient light sensor may be overlapped by a pixel array in display 14 (e.g., an active area of the display that is configured to display images). The pixel array may, as an example, form part of a liquid crystal display and may have portions that can be selectively rendered transparent to allow ambient light from the exterior of device 10 to pass to an ambient light sensor in an interior portion of device 10. By locating the ambient light sensor behind the active area of the display, the appearance of device 10 may be enhanced and the amount of space consumed by the ambient light sensor may be reduced. Ambient light sensor performance can also be enhanced. For example, in dim lighting conditions, ambient light sensor noise can be reduced by enhancing the transparency of pixels in the display that overlap the ambient light sensor, whereas in bright lighting conditions that appearance of display 14 can be enhanced by decreasing the transparency of these pixels. Configurations in which the ambient light sensor is located under an inactive display area (e.g., a notch or pixel array window opening that is free of pixels) or is located elsewhere within device 10 may also be used.

During operation, control circuitry 16 can gather measurements with the ambient light sensor while momentarily dimming a backlight in display 14 or other light source that generate stray light. This may help reduce noise during ambient light measurements. Ambient light measurements can also be gathered while a display backlight is active (e.g., by modulating the backlight so that the contribution of the backlight illumination to the ambient light sensor reading can be removed from the ambient light sensor reading using digital and/or analog signal processing techniques implemented by control circuitry 16).

Figure 2:
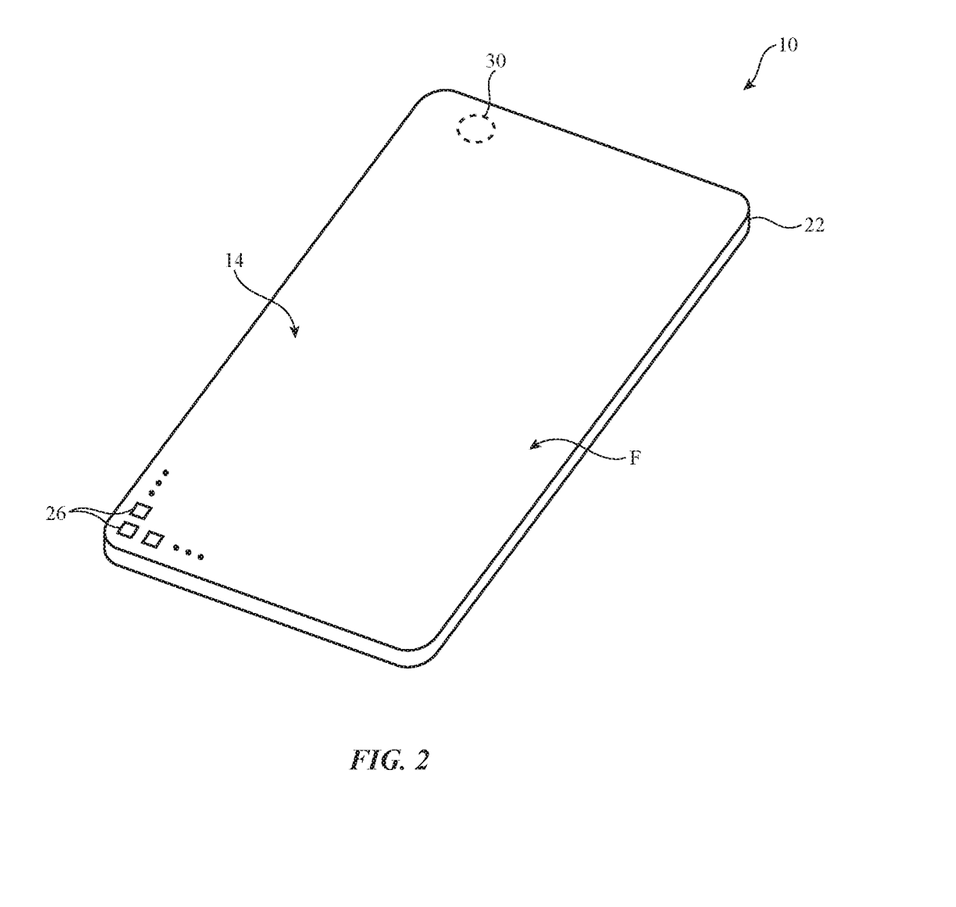
FIG. 2 is a perspective view of an electronic device with an ambient light sensor in accordance with an embodiment.

A perspective view of an illustrative electronic device of the type that may include an ambient light sensor is shown in FIG. 2. In the example of FIG. 2, device 10 includes a display such as display 14 mounted in housing 22. Display 14 may be a liquid crystal display or other suitable display. Display 14 may have an array of pixels 26 that extend across some or all of front face F of device 10 and/or other external device surfaces. The pixel array may be rectangular or may have other suitable shapes. Display 14 may be protected using a display cover layer (e.g., a transparent front housing layer) such as a layer of transparent glass, clear plastic, sapphire, or other clear layer. The display cover layer may overlap the array of pixels 26.

Housing 22, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 22 and display 14 may separate an interior region of device 10 from an exterior region surrounding device 10. Housing 22 may be formed using a unibody configuration in which some or all of housing 22 is machined or molded as a single structure or may be formed using multiple structures (e.g., an internal frame structure, one or more structures that form exterior housing surfaces, etc.). If desired, a wristband or other strap may be coupled to a main portion of housing 22 (e.g., in configurations in which device 10 is a wristwatch).

Pixels 26 may cover substantially all of the front face of device 10 or display 14 may have inactive areas (e.g., notches, rectangular areas, or other regions) that are free of pixels 26. The inactive areas may be used to accommodate an opening for a speaker and windows for optical components such as image sensors, an ambient light sensor, an optical proximity sensor, a three-dimensional image sensor such as a structured light three-dimensional image sensor, a camera flash, etc. In an illustrative configuration, pixels 26 may extend over front surface F of device 10 and may overlap an ambient light sensor in region 30. In this type of arrangement, ambient light may pass to the ambient light sensor in region 30 through the array of pixels 26 in display 14.

Figure 3:
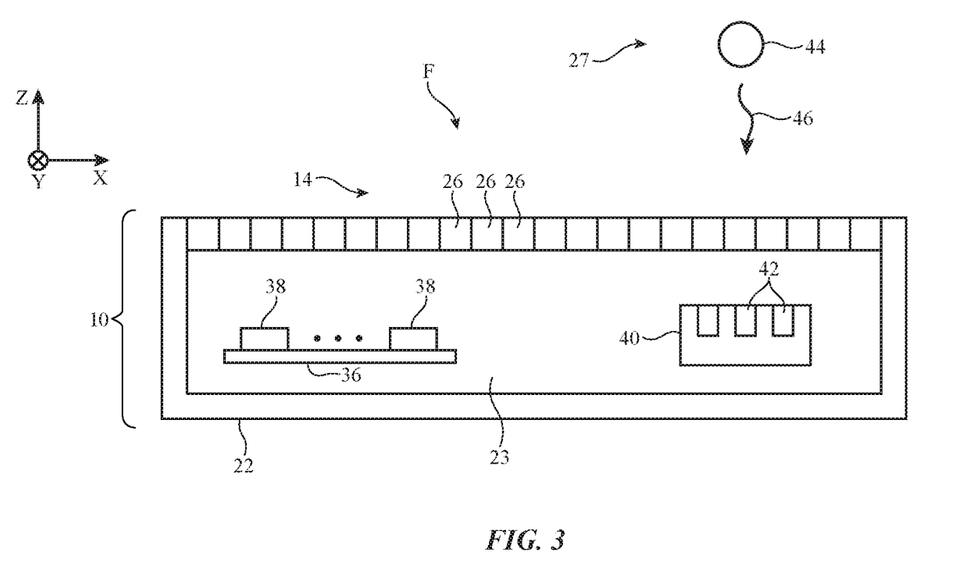
FIG. 3 is a cross-sectional side view of an illustrative electronic device with a display and ambient light sensor in accordance with an embodiment.

FIG. 3 is a cross-sectional side view of device 10 of FIG. 2 in an illustrative configuration in which pixels 26 overlap ambient light sensor 40. As shown in FIG. 3, ambient light sensor 40 may have one or more photodetectors 42. A single photodetector 42 (or set of photodetectors 42) may be used to make monochromatic light measurements (e.g., measurements of light intensity) or a set of photodetectors 42 that have color filters of different respective colors may be used to make intensity and color measurements on ambient light 46. A multi-channel ambient light sensor may, for example, have at least 2, at least 5 at least 10, fewer than 20, or other suitable number of photodetectors 42, each of which measures light in a different band of colors. By using multiple channels of different colors in this way, ambient light sensor 40 may be used to measure the color of ambient light 46 (e.g., as color coordinates, a color temperature, etc.) as well as the overall intensity of the ambient light 46. Ambient light sensor 40 may be mounted in interior region 23 of housing 22 under display 14. Display 14 and housing 22 may separate interior region 23 from exterior region 27 surrounding device 10. Electrical components 38 (see, e.g., control circuitry 16 and input-output devices 12 of FIG. 1) may be mounted within interior region 23 (e.g., on one or more printed circuits such as printed circuit 36).

Display 14 has an array of pixels 26. Pixels 26 extend over front face F of device 10 and form an active area for display 14 in which images are displayed. A display cover layer (e.g., a layer of glass, crystalline material such as sapphire, polymer, etc.) may overlap pixels 26. Each pixel 26 may be formed from thin-film pixel circuitry (e.g., thin-film transistors, thin-film capacitors, and pixel electrodes) and color filter elements (e.g., red color filter elements, green color filter elements, and blue color filter elements). Color filter elements can be formed on the same substrate as the thin-film circuitry of pixels 26 or a first substrate (e.g., a thin-film transistor substrate) may be used to support the thin-film circuitry and a second substrate (e.g., a color filter substrate) may be used to support an array of color filter elements. Metal traces and other opaque structures in pixels 26 may block light, however, each pixel 26 also has a region where transparency can be adjusted to permit light to pass. During normal operation, pixel transparency is adjusted so that a desired image is displayed by display 14. During ambient light measurements, a set of pixels that overlaps sensor 40 can be rendered at least partly transparent, thereby allowing for the passage of ambient light through these pixels. In particular, the presence of transparent (semitransparent) pixels that overlap ambient light sensor 40 may allow ambient light 46 from external light sources such as external light source 44 to pass to ambient light sensor 40 through display 14. Window openings, notches, and other structures may also be formed in display 14 to allow ambient light to pass to ambient light sensor 40.

As the example of FIG. 3 demonstrates, ambient light sensor 40 may, in some configurations, be mounted under display 14. In this location within interior 23 of housing 22, the active area of display 14 that is formed by pixels 26 overlaps ambient light sensor 40 when viewed from the exterior of device 10 (e.g., when viewing front face F). By mounting ambient light sensor 40 behind pixels 26 in this way, the overall size of device 10 can be reduced, the appearance of device 10 may be enhanced, and inactive display area may be reduced. If desired, ambient light sensor 40 may be located adjacent to display 14 without receiving ambient light through display 14 (e.g., ambient light sensor 40 may be near to display 14 but not overlapped by pixels 26). Arrangements in which ambient light sensor 40 receives ambient light through an overlapping display may sometimes be described as an example.

During operation of display 14 to display an image for a user, it may be desired to capture an ambient light measurement. When capturing an ambient light measurement, pixels 26 that overlap ambient light sensor 40 can be adjusted to be at least partly transparent. This allows ambient light 46 to pass through the overlapping pixels 26 to ambient light sensor 40 for measurement. Display 14 may have a backlight unit and, during ambient light sensor measurements, the backlight unit may be momentarily turned off so that no stray illumination from the backlight unit affects the ambient light sensor measurement. Configurations in which backlight output is modulated in a known fashion so that backlight contributions to the ambient light sensor output can be subtracted by control circuitry 16 may also be used, if desired.

Figure 4:
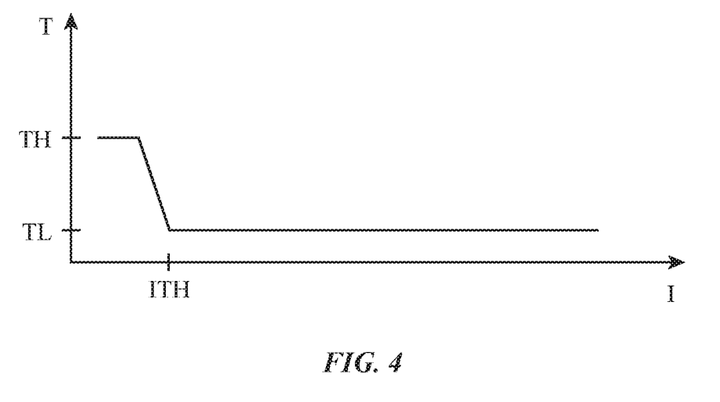
FIG. 4 is a graph showing how display transmission can be selectively adjusted based on ambient lighting conditions in accordance with an embodiment.

If desired, ambient light transmission can be adjusted dynamically. The graph of FIG. 4 illustrates how control circuitry 16 can adjust the transmission T of the set of overlapping pixels during ambient light measurements under different ambient lighting intensities (intensity I).

During dim ambient lighting conditions, ambient light intensity I will be below threshold ITH. In these conditions, control circuitry 16 can adjust the transmission T of the overlapping pixels (liquid crystal cells) to be high (e.g., a transmission level TH such as at least 30%, at least 70%, or at least 95%). The high light transmission of the pixels over sensor 40 in this situation will allow ambient light 46 to be measured with small amounts of attenuation.

At ambient light intensities above threshold ITH, there is ample ambient light to make a satisfactory ambient light measurement, so pixel transmission for the overlapping pixels can be adjusted to a low level (e.g., a transmission level TL that is less than level TH and which may be less than 30%, less than 20%, less than 5%, or less than 2%). The use of low transmission level TL in this situation may help create a dark and attractive appearance for the pixels and may enhance the appearance of display 14 while allowing light sensor 40 to continue to operate gathering ambient light measurements.

Control circuitry 16 can be calibrated to take account of the amount of selected light transmission that is present (TH, TL, etc.) during ambient light sensor data capture and thereby produce correctly adjusted ambient light readings. Although high and low transmission levels are illustrated in the example of FIG. 4, more than two different transmission levels can be used, if desired. Transmission levels can also be adjusted based on inputs other than overall ambient light level (e.g., the location of device 10, the operating mode of device 10, manual settings, etc.).

Figure 5:
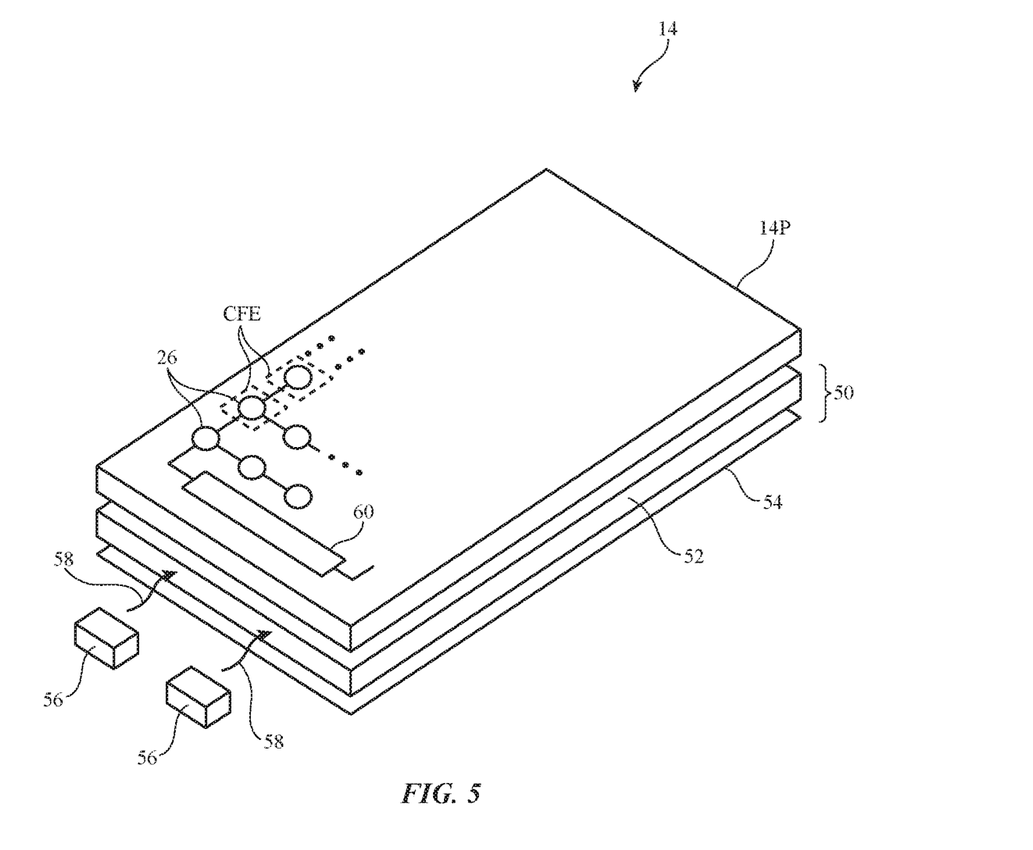
FIG. 5 is a perspective view of illustrative display layers in accordance with an embodiment.

FIG. 5 is a partly exploded perspective view of display 14 showing illustrative components that may be used for display 14. In the example of FIG. 5, display 14 includes liquid crystal display panel 14P and backlight unit 50. Backlight unit 50 has light guide layer 52 and reflector 54. Light sources (e.g., light-emitting diodes 56) emit light 58 into light guide layer 52, which is conveyed through light guide layer in accordance with the principle of total internal reflection. Light scattering features (pits, bumps, etc.) in layer 52 help scatter the light outwards though display panel 14P. The scattered light serves as backlight illumination for pixels 26. Reflector 54 helps enhance backlight efficiency be reflecting light that has been scattered downwards back in the upwards direction through panel 14P. Reflector 54 may be formed from a layer of white polymer, a dielectric mirror formed from a stack of alternating higher and lower refractive index layers, and/or other reflective structures.

Panel 14P may have display driver circuitry 60 (and/or display driver circuitry can be mounted on an associated printed circuit). Display driver circuitry 60 (e.g., the display control circuitry of control circuitry 16) controls the light transmission levels of liquid crystal pixels 26. If desired, a first portion of display driver circuitry 60 may be used in controlling pixels that overlap sensor 40 and another portion of display driver circuitry 60 (e.g., a portion on a common integrated circuit or separate integrated circuit) may be used in controlling the remainder of the pixels in panel 14P. In other configurations, all of pixels 26 are controlled together using display driver circuitry 60 (e.g., by loading frames of data into the array of pixels 26 together).

To provide display 14 with the ability to display color images, color filter elements CFE may be formed in pixels 26. For example, each pixel 26 may have a color filter element of a different non-neutral color (e.g., red, green, blue, etc.). Color filter elements CFE may, as an example, be formed from colored polymer. If desired, some pixels 26 (e.g., pixels that overlap sensor 40) may be clear (e.g., these pixels may not be overlapped by color filter elements).

In arrangements in which light 46 passes through colored pixels 26 before being detected by sensor 40, control circuitry 16 can selectively allow light to pass through subsets of pixels 26 of different colors at different times during ambient light measurements. For example, during a first measurement at a first time only red overlapping pixels are made transparent while the blue and green pixels are set to minimum transmission levels. In a second measurement at a second time, ambient light 46 passes only through the green pixels and in a third measurement at a third time, ambient light 46 is measured after passing through the blue pixels only. Because the color filter elements in this scenario provide additional spectral filtering that can be accounted for by control circuitry 16 when determining the color of measured ambient light, ambient light measurements with enhanced spectral resolution may be gathered. In an alternative arrangement, red, green, and blue color filter elements CFE can be removed from some or all pixels 26 that overlap sensor 40 and through which ambient light 46 passes to sensor 40.

Figure 6:
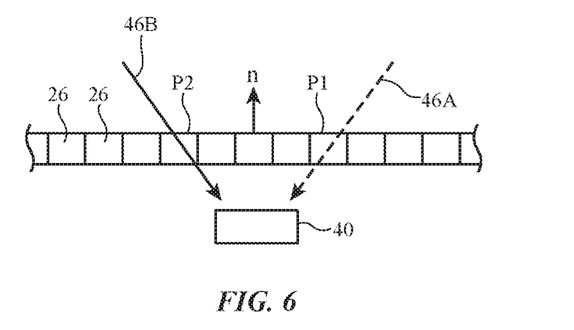
FIG. 6 is a cross-sectional side view of an illustrative ambient light sensor overlapped by a display in accordance with an embodiment.

FIG. 6 is a cross-sectional side view of display 14 showing how the location of the set of one or more pixels 26 of enhanced transparency may be adjusted dynamically to allow directional ambient light information to be measured. As an example, the pixels 26 that overlap sensor 40 may initially all be provided with low transmission (e.g., less than 1%, less than 0.1%, etc.). A selected pixel (or selected group of pixels such as a circular group of pixels or a group pixels of other suitable shape) can then be momentarily provided with a high transparency to allow an ambient light sensor measurement to be made. The location of the selected pixels (or set of pixels) can then be moved relative to sensor 40 while additional measurements are made. In this way, sensor 40 can, in sequence, gather a series of measurement of ambient light arriving from different directions (e.g., different angular orientations with respect to surface normal n of display 14). As an example, pixel P1 can be made transparent at a first measurement time while all other nearby pixels 26 are made opaque, thereby permitting only ambient light 46A to reach sensor 40. At a second measurement time, pixel P2 can be made transparent while all other nearby pixels 26 are made opaque, thereby permitting only ambient light 46B to reach sensor 40. In this way, ambient light rays with different angular orientations (e.g., ambient light ray 46A and ambient light ray 46B in this example) can be sampled and an angular orientation map (spatial map) of the angular (spatial) distribution of ambient light 46 in the vicinity of device 10 can be obtained. Directional ambient light information can then be used by control circuitry 16 in creating desired graphical effects on display 14, in adjusting display color cast and/or intensity, etc.

Figure 7:
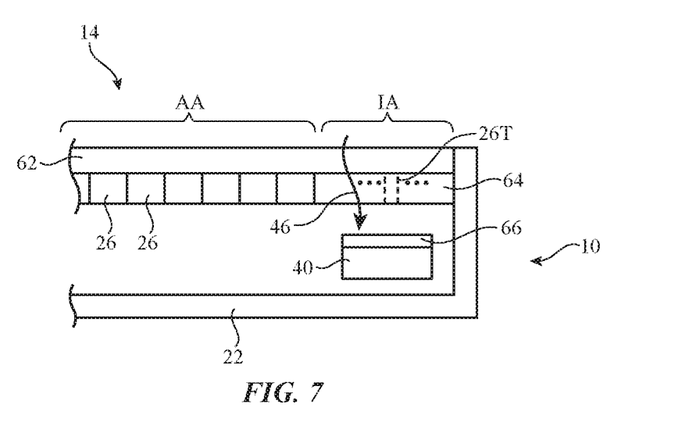
FIG. 7 is a cross-sectional side view of an illustrative electronic device having a display with a notch or other opening overlapping an ambient light sensor in accordance with an embodiment.

As shown in the illustrative configuration of device 10 in the cross-sectional side view of FIG. 7, display 40 may contain an active area AA in which pixels 26 produce images and may have an inactive area IA that does not produce images (e.g., a notch, an opening surrounded on all sides by pixels 26 that produce images, or other area without pixels for producing images). Display cover layer 62 may overlap and protect active area AA and inactive area IA. In inactive area IA, structures 64 may allow ambient light 46 to pass to overlapped ambient light sensor 46. An optional light modulator layer such as light modulator 66 may be incorporated into ambient light sensor 40, may be incorporated into structures 64, and/or may otherwise overlap the top of ambient light sensor 40. Light modulator 66 may be a liquid crystal light modulator, an electronic ink light modulator, or other light modulator structure that exhibits an adjustable light transmission that can be controlled by control circuitry 16. Control circuitry 16 may, as an example, lower the transmission of layer 66 in bright lighting when it is desired to enhance the appearance of display 14 and increase the transmission of layer 66 in low ambient lighting conditions to lower ambient light sensor noise.

Structures 64 may include adjustable clear pixels 26T that do not contain color filter elements. Pixels 26T may be formed on the same substrate as pixels 26. In some configurations, structures 64 may include a separate pixelated light modulator (e.g., a pixelated liquid crystal light modulator, a pixelated electronic ink light modulator, etc.).

In an arrangement in which pixels 26T are adjustable clear pixels, pixels 26T do not contain non-neutral color filter elements (e.g. pixels 26T are free of red, blue, and green polymer color filter element structures) and therefore do not impart color to ambient light 46 as ambient light 46 passes through structures 64 to ambient light sensor 40. If desired, the intensity of pixels 26T in structures 64 can be modulated (e.g., to accommodate dim or bright ambient lighting conditions). Pixels 26T can also be adjusted to create a subset of clear pixels that are placed in different locations at different times to gather directional ambient light information (e.g., pixels 26T can be adjusted to move a transparent pixel or cluster or transparent pixels to different locations while sampling ambient light and thereby gathering directional ambient light data). If desired, structures 64 may be free of pixel structures and may contain transparent structures (e.g., glass, polymer, air, etc.) or may contain a light modulator (e.g., a liquid crystal light modulator, an electronic ink light modulator, an electrochromic light modulator, a photochromic layer, or other fixed-transmission and/or adjustable-transmission layer). In these arrangements, the light modulator may be pixelated or may contain a single structure of adjustable light transmission.

Figure 8:
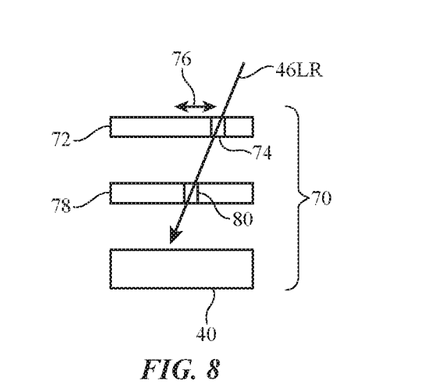
FIG. 8 is a cross-sectional side view of an illustrative directional ambient light sensor system in accordance with an embodiment.

FIG. 8 is a cross-sectional side view of an ambient light sensor system that may be used to make directional ambient light measurements. System 70 may be used when it is desired to provide ambient light sensor 40 with the ability to make directional ambient light measurements. In the example of FIG. 8, adjustable layer 72 (which may be placed where shown by structures 64 of FIG. 7 or other location overlapping sensor 40) and fixed aperture layer 78 overlap ambient light sensor 40. Fixed aperture layer 78 is opaque and has clear aperture 80 (e.g., a transparent circular window in the center of layer 78). Adjustable layer 72 may be a pixelated liquid crystal light modulator or other adjustable light modulator that has the ability to make different selected portions of layer 72 clear or opaque. During operation, a selected portion of layer 72 may be rendered transparent (at a desired high, moderate, or low transmission level, for example) and this transparent portion (e.g., transparent area 74 of FIG. 8) may be moved laterally across the surface of layer 72 (e.g., in lateral directions such as directions 76). As shown in FIG. 8, only ambient light rays such as illustrative ambient light ray 46LR with orientations that allow the light rays to pass both through clear area 74 and clear aperture 80 will be able to reach sensor 40. By systematically varying the location of transparent area 74 under control of control circuitry 16, system 70 can be used to sample ambient light rays such as illustrative ambient light ray 46LR that are arriving at sensor 40 in a variety of directions and thereby produce desired directional ambient light information.

Figure 9:
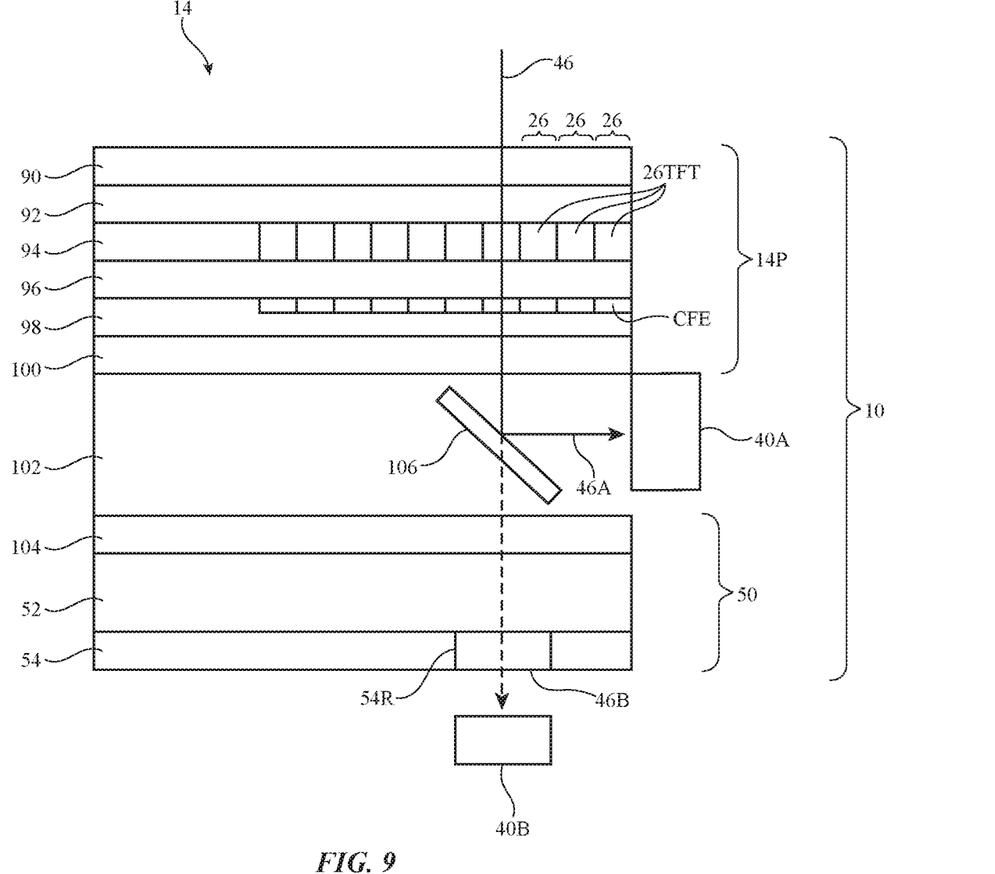
FIG. 9 is a cross-sectional side view of an illustrative display and associated ambient light sensor systems in accordance with an embodiment.

As shown by the illustrative configuration of FIG. 9, device 10 may include reflective element 106 in air gap 102 for directing ambient light 46 laterally (see, e.g., reflected ambient light 46A, which may be detected by a horizontally oriented ambient light sensor such as ambient light sensor 40A). Reflective element 106 may be a mirror, a beam splitter, an adjustable reflector such as an electrically adjustable mirror (e.g., a cholesteric liquid crystal mirror), and/or other optical component for helping to redirect ambient light 46 to ambient light sensor 40A in a fixed or tunable arrangement. In a configuration in which element 106 has adjustable reflectivity, element 106 may be placed in a reflective state (e.g., a high reflectivity mode of operation) when it is desired to direct ambient light to sensor 40A for measurement and may be placed in a transmissive state (e.g., a high light transmission mode of operation) when it is desired to allow backlight illumination from backlight unit 50 to illuminate pixels 26 to display an image for a user of device 10.

Display 14 of FIG. 9 is a liquid crystal display. Liquid crystal layer 96 may be sandwiched between a thin-film transistor layer and color filter layer 98. The thin-film transistor layer has a transparent thin-film transistor substrate 92 covered with an array 94 of individually adjustable thin-film transistor cells 26TFT each of which is used to supply an adjustable electric field to an associated pixel-sized portion of liquid crystal layer 96 (e.g., there is one cell 26TFT for each pixel 26 in display 14). Cells 26TFT each include a thin-film transistor, an electrode, and a thin-film storage capacitor on a transparent substrate. Color filter layer 98 includes a transparent substrate with an array of color filter elements CFE (e.g., layer 98 includes a transparent substrate, a black matrix on the substrate with a grid of openings corresponding to pixels 26, and a corresponding array of red, green, and blue polymer color filter structures in the openings). The thin-film transistor, color filter structures, and liquid crystal layer 96 are interposed between upper polarizer 90 and lower polarizer 100, forming display panel 14P.

Backlight unit 50 may include light guide layer 52 (supplied with light 58 from light-emitting diodes 56 as described in connection with FIG. 5), rear reflector 54, and a stack of one or more optical films 104 (e.g., compensation layers, brightness enhancement films, diffusers, etc.). With one illustrative configuration, reflective element 106 may be omitted so that ambient light measurements can be measured with ambient light sensor 40B rather than ambient light sensor 40A. In this configuration, rear reflector 54 may have a region 54R in which reflective material is removed and/or exhibits reduced reflectivity, thereby allowing ambient light 46 such as ambient light ray 46B to pass to ambient light sensor 40 under reflector 54. The presence of region 54R may be visually obscured due to the presence of a diffuser in layers 104. If desired, region 54R may be provide with an adjustable reflectively element (e.g., an electrically adjustable cholesteric liquid crystal mirror or other electrically adjustable reflector). When it is desired to reflect backlight illumination through pixels 26, the reflective element may be placed in a high reflectivity state. During ambient light sensor measurements, the reflective element may be placed in a low reflectivity and high transmission state in which sufficient light is transmitted through region 54R to ambient light sensor 40B to allow an ambient light sensor reading to be gathered.

Using these arrangements and/or other ambient light sensing arrangements, control circuitry 16 can gather information on ambient lighting conditions (e.g., ambient light levels, directional ambient light information such as information on the location and brightness of light sources in the operating environment of device 10, ambient light color information, etc.). Control circuitry 16 can then take suitable action based on this ambient light information. For example, the color cast (white point) of images displayed on display 14 can be dynamically adjusted based on the measured color of ambient light, display intensity can be increased when bright lighting conditions are detected (so that images are viewable) and can be decreased when dim lighting conditions are detected (so that power can be conserved), directional ambient light information can be used to determine whether ambient light from directional light sources is illuminating display 14 and should therefore be used in making adjustments to display 14, directional ambient light information can be used to create on-screen shadows for visual items on display 14 that correspond to the direction of real-life ambient light shadows, and/or other adjustments may be made to images displayed by display 14. If desired, non-display operations in device 10 can be adjusted based on output from ambient light sensor 40 (e.g., audio components can be controlled, other input-output devices 12 can be adjusted, etc.).

Device 10 may be operated in a system that uses personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made to the described embodiments. The foregoing embodiments may be implemented individually or in any combination.

Table of Reference Numerals

| | | | |
|---|---|---|---|
| 10 | Electronic Device | 12 | Input-Output Devices |
| 14 | Display | 16 | Control Circuitry |
| 18 | Sensors | 23 | Interior Region |
| 22 | Housing | 26 | Pixels |
| 40 | Ambient Light Sensor | 44 | Light Source |
| | | 46 | Ambient Light |
| 50 | Backlight unit | 42 | Photodetectors |
| 52 | Light guide layer | 54 | Reflector |
| 38 | Electrical Components | 56 | Light-emitting diodes |
| 60 | Display Driver Circuitry | CFE | Color filter elements |
| | | 27 | Exterior Region |
| 58 | Light | 62 | Display cover layer |
| 14P | Display panel | 66 | Light modulator |

| Table of Reference Numerals | | | |
|---|---|---|---|
| 46A; 46B | Ambient light rays | 70 | Ambient light sensor system |
| 64 | Structures | 74 | Clear portion |
| 26T | Adjustable clear pixels | 78 | Fixed layer |
| 72 | Adjustable layer | 46LR | Ambient light ray |
| 76 | Directions | 92 | Substrate |
| 80 | Aperture | 96 | Liquid crystal layer |
| 90 | Front polarizer | 100 | Rear polarizer |
| 94 | Thin-film transistor cells | 104 | Optical films |
| 98 | Color filter layer | 106 | Reflective element |
| 102 | Air gap | 26TFT | Thin-film transistor cells |
| 104 | Diffuser | | |
| 40A; 40B | Ambient light sensors | | |
| 54R | Region | | |

What is claimed is:

1. An electronic device, comprising:
a display having an array of pixels with adjustable light transmission levels;
control circuitry configured to adjust the light transmission level of a plurality of pixels in the array of pixels; and
an ambient light sensor that is overlapped by the pixels, that includes a photodetector and that is configured to:
receive, with the photodetector, first ambient light that has passed through a first portion of pixels in the plurality of pixels at a first angular orientation by selectively rendering transparent the first portion of pixels while pixels other than the first portion of pixels in the plurality of pixels are made opaque; and
receive, with the photodetector, second ambient light that has passed through a second portion of pixels in the plurality of pixels, different than the first portion of pixels, at a second angular orientation different than the first angular orientation by selectively rendering transparent the second portion of pixels while pixels other than the second portion of pixels in the plurality of pixels are made opaque.

2. The electronic device defined in claim 1 wherein display comprises a liquid crystal display.

3. The electronic device defined in claim 2 wherein the control circuitry is configured to adjust a light transmission level of the plurality of pixels in the array of pixels to a first light transmission level in first ambient lighting conditions and is configured to adjust the light transmission level of the plurality of pixels in the array of pixels to a second light transmission level in second ambient lighting conditions that are dimmer than the first ambient lighting conditions.

4. The electronic device defined in claim 3 wherein the liquid crystal display comprises color filter elements and wherein the plurality of pixels in the array of pixels does not contain color filter elements.

5. The electronic device defined in claim 3 wherein the liquid crystal display comprises color filter elements and wherein the plurality of pixels in the array of pixels contains color filter elements.

6. The electronic device defined in claim 3 wherein the control circuitry is configured to:
in a first measurement, gather first ambient light sensor readings through red pixels in the plurality of pixels;
in a second measurement that is different than the first measurement, gather second ambient light sensor readings through green pixels in the plurality of pixels; and
in a third measurement that is different than the first and second measurements, gather third ambient light sensor readings through blue pixels in the plurality of pixels.

7. The electronic device defined in claim 1 wherein the control circuitry is configured to adjust a color cast of the display based on information from the ambient light sensor.

8. An electronic device, comprising:
a liquid crystal display having a first set of pixels in an active area with color filter elements that are configured to display an image and having a second set of pixels in an inactive area through which ambient light passes;
an ambient light sensor that is configured to receive the ambient light that has passed through pixels in the second set of pixels, wherein the second set of pixels comprise adjustable clear pixels that do not contain color filter elements; and
control circuitry configured to adjust the second set of pixels by selectively rendering a first portion of pixels in the second set of pixels transparent while pixels other than the first portion of pixels in the second set of pixels are made opaque so that ambient light rays with a first angular orientation relative to the ambient light sensor are received by the ambient light sensor at a first time and by selectively rendering a second portion of pixels in the second set of pixels transparent while pixels other than the second portion of pixels in the second set of pixels are made opaque so that ambient light rays with a second angular orientation different than the first angular orientation relative to the ambient light sensor are received by the ambient light sensor at a second time.

9. The electronic device defined in claim 8 wherein the second set of pixels contains red, green, and blue color filter elements and wherein the control circuitry is configured to adjust the second set of pixels to selectively pass:
red ambient light to the ambient light sensor at a first time;
green ambient light to the ambient light sensor at a second time that is different than the first time; and
blue ambient light to the ambient light sensor at a third time that is different than the first and second times.

10. The electronic device defined in claim 9 wherein the ambient light sensor comprises a color ambient light sensor.

11. The electronic device defined in claim 8 wherein the control circuitry is configured to adjust the second set of pixels to exhibit:
a first light transmission level when the ambient light has a first intensity; and
a second light transmission level that is lower than the first light transmission level when the ambient light has a second intensity that is greater than the first intensity.

12. An electronic device, comprising:
a display having an array of display pixels with adjustable opacity, the array of display pixels being disposed in a plane;
an ambient light sensor that is configured to receive transmitted ambient light rays that have passed through at least a portion of the display pixels overlapping with the ambient light sensor; and
an optical element having a surface that is angled with respect to the plane and configured to operate in
a reflective state to reflect the transmitted ambient light rays off the surface towards the ambient light sensor and a transmissive state to allow the transmitted ambient light rays to pass through.

13. The electronic device defined in claim 12, further comprising:
an additional ambient light sensor configured to receive the transmitted ambient light rays passing through the optical element when the optical element is in the transmissive state.

\* \* \* \* \*